(12) United States Patent
Fujimoto

(10) Patent No.: US 10,627,868 B2
(45) Date of Patent: Apr. 21, 2020

(54) FLEXIBLE DEVICE

(71) Applicant: Sharp Kabushiki Kaisha, Sakai, Osaka (JP)

(72) Inventor: Hidetoshi Fujimoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/331,173

(22) PCT Filed: Sep. 13, 2016

(86) PCT No.: PCT/JP2016/076981
§ 371 (c)(1),
(2) Date: Mar. 7, 2019

(87) PCT Pub. No.: WO2018/051414
PCT Pub. Date: Mar. 22, 2018

(65) Prior Publication Data
US 2019/0258295 A1    Aug. 22, 2019

(51) Int. Cl.
*H05K 5/02* (2006.01)
*G06F 1/16* (2006.01)
*G09F 9/30* (2006.01)
*G09F 9/00* (2006.01)

(52) U.S. Cl.
CPC .......... *G06F 1/1652* (2013.01); *G06F 1/1618* (2013.01); *G06F 1/1643* (2013.01); *G06F 1/1681* (2013.01); *G09F 9/00* (2013.01); *G09F 9/30* (2013.01)

(58) Field of Classification Search
CPC ...................................................... H05K 5/00
See application file for complete search history.

(56) References Cited

U.S. PATENT DOCUMENTS

| | | | |
|---|---|---|---|
| 2007/0138806 A1* | 6/2007 | Ligtenberg | E05C 19/16 292/251.5 |
| 2015/0009128 A1 | 1/2015 | Matsumoto | |
| 2015/0035777 A1 | 2/2015 | Hirakata et al. | |
| 2015/0227248 A1* | 8/2015 | Yamazaki | G06F 3/0412 345/173 |
| 2016/0062485 A1 | 3/2016 | Kondo | |

FOREIGN PATENT DOCUMENTS

| | | |
|---|---|---|
| JP | 2006-174506 A | 6/2006 |
| JP | 4344965 B2 | 10/2009 |
| JP | 2010-256660 A | 11/2010 |
| JP | 2011-114609 A | 6/2011 |
| JP | 2014-103631 A | 6/2014 |
| JP | 2015-028617 A | 2/2015 |
| JP | 2015-045846 A | 3/2015 |
| JP | 2015-166865 A | 9/2015 |
| WO | 2014/142269 A1 | 9/2014 |

OTHER PUBLICATIONS

Official Communication issued in International Patent Application No. PCT/JP2016/076981, dated Nov. 22, 016.

* cited by examiner

*Primary Examiner* — Jerry Wu
(74) *Attorney, Agent, or Firm* — Keating & Bennett, LLP

(57) ABSTRACT

A flexible device includes at least a pair of magnets, and at least the pair of magnets are disposed such that a repelling force acts between the magnets when a display portion is folded opposing one part and the other part of the flexible display.

8 Claims, 10 Drawing Sheets

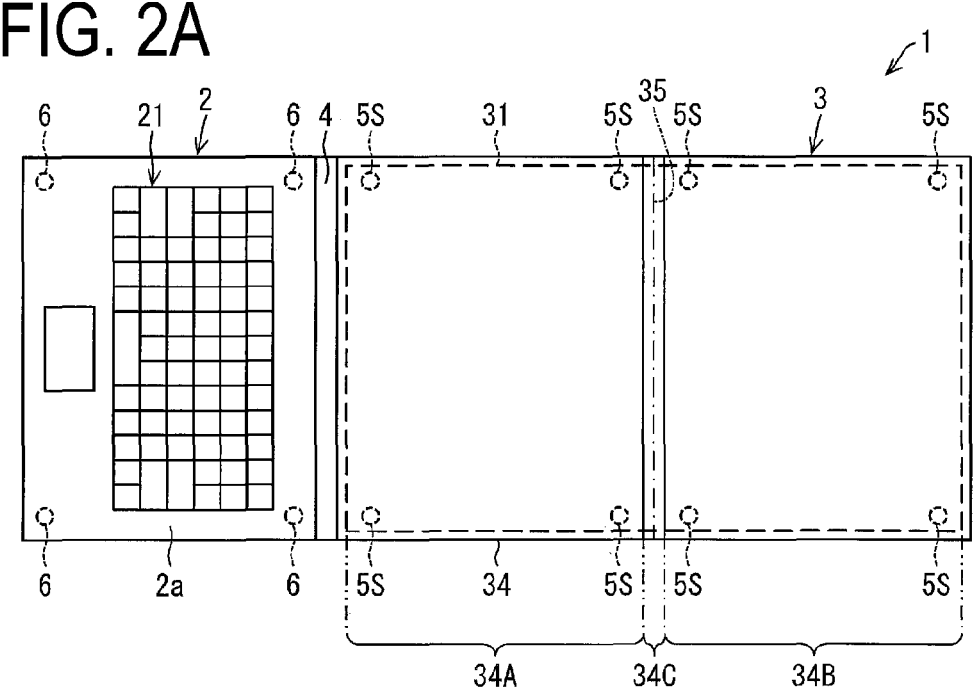
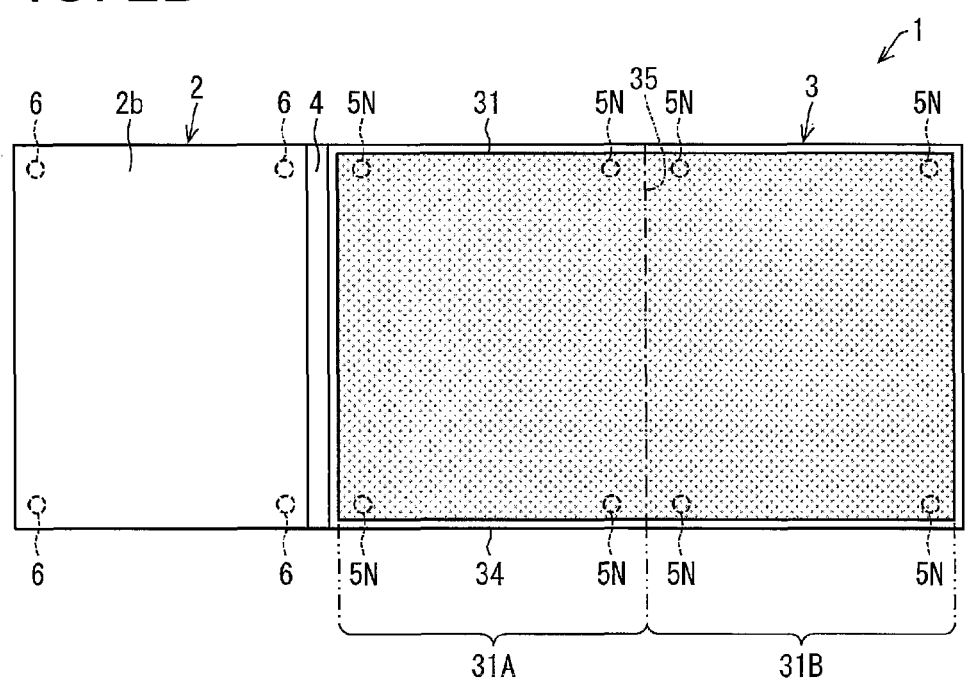

FLEXIBLE DEVICE

TECHNICAL FIELD

The disclosure relates to a flexible device including a flexible display.

BACKGROUND ART

Recently, miniaturizing portable electronic devices such as notebook computers, mobile telephone, and portable information terminals for better mobility is desired. However, there is a preference for large display portions and operation parts for increased information volume, and improved viewability and operability.

To this end, progress is being made in the development of folding type flexible devices including foldable flexible display (see PTL 1).

PTL 1 describes a display device with a display portion including first and second foldable regions as a folding type flexible device.

The display portion including a display panel, support panels arranged on at least the display surface side of the display panel or the opposing surface side, and a connecting member arranged between the display panel and support panel and fixed respectively to each.

The display portion includes low flexibility regions and a high flexibility region, and the support panels are only provided in the low flexibility regions. Thus, the connecting member, in a high flexibility region acting as a hinge part (folding part), is exposed between the support panels arranged in the low flexibility regions interposing the high flexibility region.

The display device further includes a detecting unit to detect when the display portion is in a folded state and supply folded signals. In the second region of the display portion in a folded state, the display device displays images containing a dark grayscale lower in power consumption than in a case displaying another image. The detecting unit including a mark arranged in the vicinity of the display portion to detect when the display portion is in a folded state, and a sensor to detect the mark.

PTL 1 describes using a magnetic sensor for the sensor and magnets for the mark, thereby to identify the mark, and use the magnetic force of the magnets to hold the display device in a folded state.

CITATION LIST

Patent Literature

PTL 1: JP 2015-045846 A (published Mar. 12, 2015)

SUMMARY

Technical Problem

However, the problem in such a flexible display is applying a load to the folded part results in creasing, thus damaging the flexible display.

The display device according to PTL 1 is folded by folding the region of high flexibility, such that the front surfaces on the same surface side touch each other located in the low flexibility regions interposing the high flexibility region.

Having support panels with large thickness results in increasing the thickness of the display device when folding the display portion.

However, in the display device described above, in a case that the display device is not provided support panels disposed on the inside when folding the display portion, or the thickness of the support panels disposed on the inside when folding the display portion is relatively thin, the degree of folding in the high flexibility region, that is, the folding part, increases, as does the load on the high flexibility region.

A particular concern is that in a case that the surfaces on the inside when folding the display portion include a display panel (namely, a flexible display), an excessive load is applied to the part where the display panel is folded, resulting in damage to the display panel such as creasing.

Moreover, in PTL 1, as the magnetic force of magnets is used to hold the display device in a folded state, there is a serious concern that the display panels are adsorbed by the magnetic force, and this will damage the display panels.

In consideration of the above problems, the disclosure has been conceived, and an object thereof is to provide a flexible device reducing the load on the folding part and preventing damage to the flexible display.

Solution to Problem

To the solve the problem, a flexible device according to one aspect of the disclosure includes a main part having a sheet-like shape, a display portion, and a wiring part being flexible and connecting the main part with the display portion. The display portion includes a flexible display, a support body including at least one foldable folding part and the flexible display being laid straddling the folding part, and at least a pair of magnets provided on the support body. At least the pair of magnets being disposed to cause a repelling force to act between the magnets when folding the display portion such that one part and the other part of the flexible display are opposing.

Advantageous Effects of Disclosure

One aspect of the disclosure provides a flexible device reducing the load on the folding part and preventing damage to the flexible display.

BRIEF DESCRIPTION OF DRAWINGS

FIG. 2A is a plan view illustrating the schematic configuration of a flexible device according to an embodiment of the disclosure, viewing the flexible device, in a state of being expanded 180 degrees, from support body side of the display portion. FIG. 2B is a plan view illustrating the schematic configuration of a flexible device according to an embodiment of the disclosure, viewing the flexible device, in a state of being expanded 180 degrees, from the flexible display side of the display portion.

DESCRIPTION OF EMBODIMENTS

A detailed description follows regarding embodiments of the disclosure.

A description follows regarding one embodiment of the disclosure, on the basis of FIGS. 1 to 11.

Schematic Configuration of Flexible Device

Hereinafter, the present embodiment will be described while exemplifying a case in which a flexible device according to the present embodiment (electronic device) is an information processing device such as a personal computer provided with a main part including a key input operating part.

Figure 1:
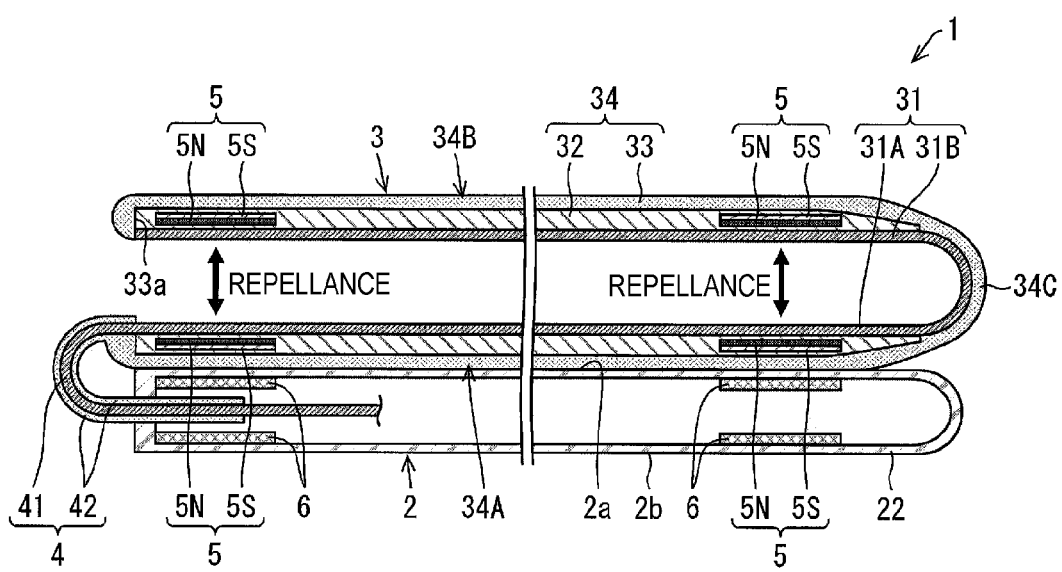
FIG. 1 is a partial cross-sectional view illustrating the schematic configuration of a flexible device according to an embodiment of the disclosure, when folding the display portion on top of the main part with the flexible display on the inside.

FIG. 1 is a partial cross-sectional view illustrating the schematic configuration of a flexible device 1 according to the present embodiment, when folding the display portion 3 on top of the main part 2 with the flexible display 31 on the inside. FIG. 2A is a plan view illustrating the schematic configuration of a flexible device 1 according to the present embodiment, viewing the flexible device 1 in a state of being expanded 180 degrees, from the support body 34 side of the display portion 3. FIG. 2B is a plan view illustrating the schematic configuration of a flexible device 1 according to the present embodiment, viewing the flexible device 1 in a state of being expanded 180 degrees, from the flexible display 31 side of the display portion 3. Here, "the flexible device 1 in a state of being expanded 180 degrees" refers to a so-called fully flattened state flattening the flexible device 1 by opening.

Figure 3:
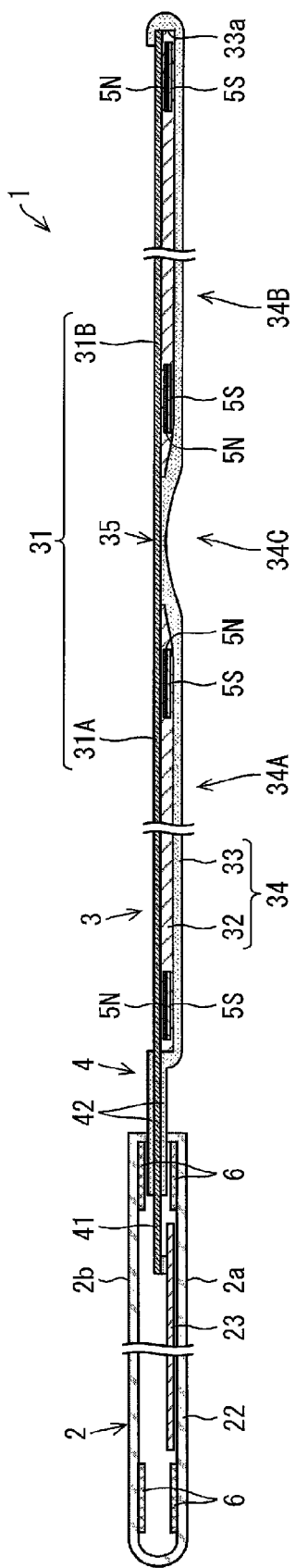
FIG. 3 is a partial cross-sectional view illustrating the schematic configuration of the main parts of a flexible device, in a state of being expanded 180 degrees, according to an embodiment of the disclosure.
Figure 4:
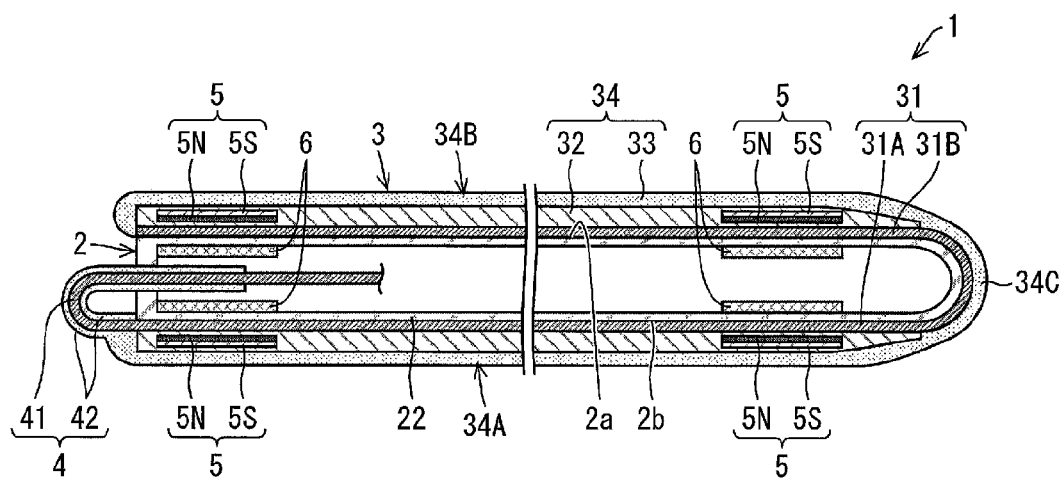
FIG. 4 is a partial cross-sectional view illustrating the schematic configuration of a flexible device according to an embodiment of the disclosure, when folding the display portion such that it winds around the main part with the flexible display on the inside.
Figure 5:
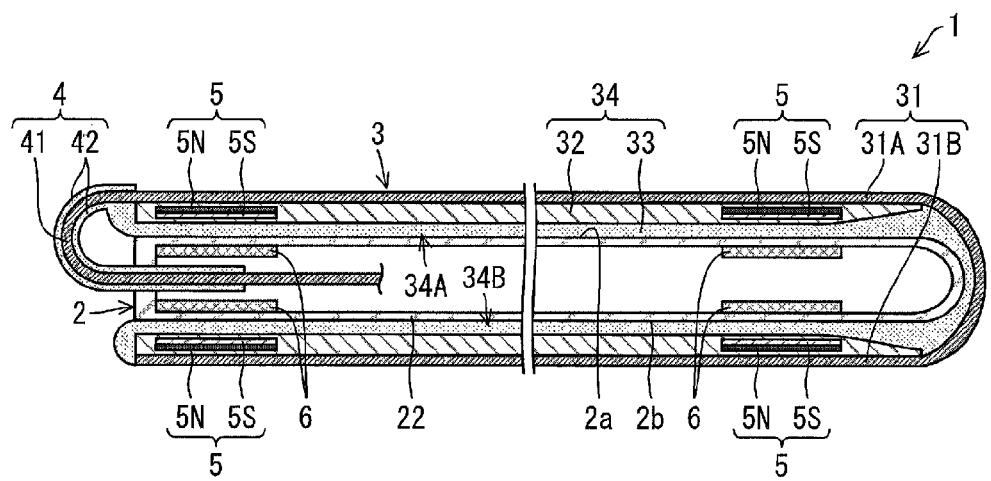
FIG. 5 is a partial cross-sectional view illustrating the schematic configuration of a flexible device according to an embodiment of the disclosure, when folding the display portion such that it winds around the main part with the flexible display on the outside.
Figure 6:
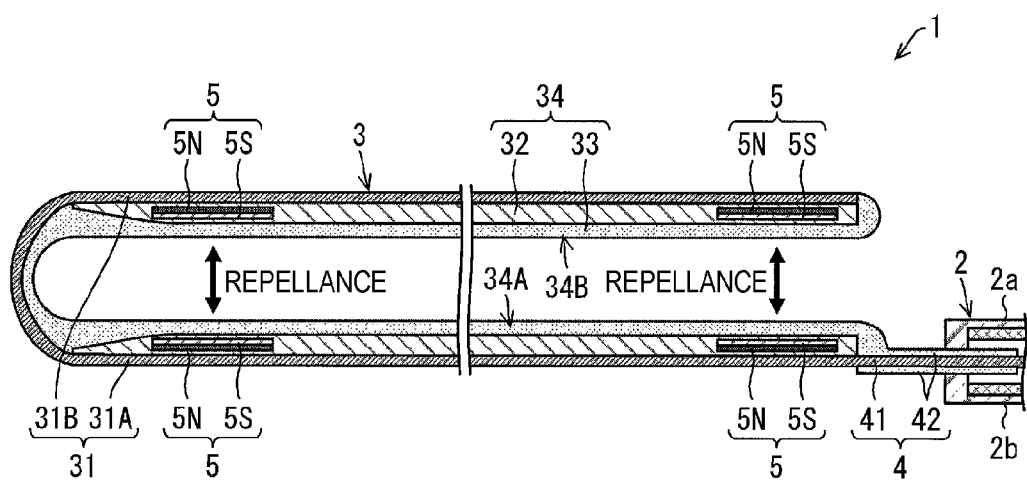
FIG. 6 is a partial cross-sectional view illustrating the schematic configuration of a flexible device according to an embodiment of the disclosure, when folding the display portion lateral to the main part with the flexible display on the outside.

In addition, FIG. 3 is a partial cross-sectional view illustrating the schematic configuration of the main parts of a flexible device 1, in a state of being expanded 180 degrees, according to the present embodiment. FIG. 4 is a partial cross-sectional view illustrating the schematic configuration of a flexible device 1 according to the disclosure, when folding the display portion 3 such that it winds around the main part 2 with the flexible display 31 on the inside. FIG. 5 is a partial cross-sectional view illustrating the schematic configuration of a flexible device 1 according to the present embodiment, when folding the display portion 3 such that it winds around the main part 2 with the flexible display 31 on the outside. FIG. 6 is a partial cross-sectional view of the schematic configuration of a flexible device according to the present embodiment, when folding the display portion 3 lateral to the main part 2 with the flexible display 31 on the outside.

A flexible device 1 according to the present embodiment is a folding type flexible electronic device including a flexible display 31 provided freely folding (folding) and expanding (extending) with an opening and closing operation. The flexible device 1 makes it possible to select arbitrary state between a folded state (namely, a closed state) folding the flexible device 1, and an expanded state (namely, an opened state) not folding the flexible device 1.

A flexible device 1 according to the present embodiment, as illustrated in FIG. 1 to FIG. 6, includes a main part 2 having a plate-shape including electronic components on the inside, a display portion 3, and a connecting part 4 connecting the main part 2 and display portion 3.

The main part 2 according to the present embodiment, is an information input device formed of a hollow rigid body provided with an externally-facing information input surface 2a, having an information input portion 21 such as a key input operation part like a keyboard and the like or a pad portion and the like, in a rectangular housing 22 in a plan view (see FIG. 1 for example).

Only a mounting board 23 is illustrated on the inside of the housing 22 in the main part 2 (see FIG. 3). However, the mounting board 23 includes a Central Processing Unit (CPU) and various memory. The inside of the housing 22 is also provided with electronic components such as a wireless transmitting unit, a television receiving unit, an antenna, a battery (secondary battery) and internal speakers.

In addition, although not illustrated, the side surface of the housing 22 in the main part 2, for example, may also be provided with a Universal Serial Bus (USB) terminal part, an audio output terminal part, and a power cord connecting terminal part.

In addition, the main part 2 includes adsorption parts 6 formed of magnetic material. The adsorption parts 6 will be described below.

The display portion 3 includes a flexible display 31, and a support body 34 (housing) supporting the flexible display 31. The support body 34 includes a core 32, a cover member 33 covering the core 32, and magnets 5 used as a magnetic force generating source. The magnets 5 will be described below together with the adsorption parts 6.

The flexible display 31 may be, for example, pasted onto the core 32 using such as adhesive, or integrally formed with the core 32. The cover member 33 is an outer container, and is provided on the core 32 on the side of the surface opposite the flexible display 31.

The mounting surface of the support body 34 for the core 32 and the flexible display 31, for example, may be formed with a recessed portion 33a (see FIG. 3 and FIG. 4 for example), used to lay the core 32 and the flexible display 31, and covering at least the end surface of the core 32. In addition, as illustrated in FIG. 3 and FIG. 4, the side wall upper end portion of the recessed portion 33a may fold back on part of the upper portion side (namely, the display screen side) of the flexible display 31 (specifically, on the frame region that is the non-display portion). Thereby, the cover member 33 may support (hold) the core 32 and the flexible display 31, such that the cover member 33 interposes the peripheral portion of the core 32 and the flexible display 31.

The display portion 3, as illustrated in FIG. 2A, FIG. 2B and FIG. 3 is connected to the main part 2 by the connecting part 4. When the flexible device 1 is expanded 180 degrees, such that the display portion 3 and the main part 2 fully flatten, the cover member 33 is disposed on the information input surface 2a side of the main part 2, and the flexible display 31 is disposed on the opposite surface of the information input surface 2a of the main part 2 (hereinafter, for the sake of convenience, referred as "rear surface 2b"). That is, the main part 2 and the display portion 3 are connected, such that the information input surface 2a of the main part 2 and the flexible display 31 face mutually reversed directions (namely, directions that are 180 degrees different) when the flexible display 1 is 180 degrees expanded.

Although not illustrated, the flexible display 31 has a configuration interposing an electro-optical element between resin films with a circuit and the like for driving the electro-optic element.

The flexible display 31 is not particularly limited as long as it is flexible and is a foldable display panel. Examples include an organic electro luminescence (EL) display including an organic light emitting diode (OLED) for the electro-optical element, an EL display such as an inorganic EL display including an inorganic light emitting diode for the electro-optical element, a quantum dot light emitting diode (QLED) display including a QLED for the electro-optical element, a liquid crystal display including a liquid crystal display element for the electro-optical element, or electronic paper including an electrophoretic element for the electro-optical element.

Furthermore, the flexible display 31 may include a touch panel function making possible input operation by touching with a dedicated electronic pen or the fingertips of a user.

The core 32, for example, is formed of a polycarbonate resin, such as acrylonitrile-butadiene-styrene copolymer (ABS) resin, acryl resin, or carbon resin.

The cover member 33, for example, may be formed of a soft material such as silicone, rubber or elastomer, a flexible metal such as steel use stainless (SUS), or a flexible plastic.

As illustrated in FIG. 1 to FIG. 6, the support body 34 includes a folding part 34C foldably provided in the middle section of the folding part 34C in the longitudinal direction and parallel to a short-hand direction perpendicular to the longitudinal direction, such that it divides the support 34.

Hereinafter, for the sake of convenience, as illustrated in FIG. 2A, in a plan view, the region of the support body 34 disposed on the connecting part 4 side interposing the folding part 34C is referred to as a first support part 34A, and the region disposed on the side opposite the first support part 34A interposing the folding part 34C (namely, the side opposite the connecting part 4) is referred to as a second support part 34B.

The flexible display 31 is laid on the support body 34 straddling the folding part 34C, such that it straddles the first support part 34A and second support part 34B.

Hereinafter, for the sake of convenience, as illustrated in FIG. 2B, in a plan view, the folding axis 35 (folding center) of the folding part 34C acting as a boundary, the region of the flexible display 31 disposed more towards the connecting part 4 side than the folding axis 35 is referred to as a first display region 31A, and the region disposed on the side opposite the first support part 31A interposing the folding axis 35 is referred to as a second display region 31B (namely, the region disposed on the side opposite the connecting part 4).

The folding part 34C, for example, as illustrated in FIG. 4 or FIG. 5, is foldably formed on the main part 2, along the surface of the side opposite the connecting part 4 in a plan view, when the display portion 3 is wound around the main part 2.

The degree of folding (curvature) of the folding part 34C is not particularly limited, but the flexible device 1 according to the present embodiment is an ultra-thin type information processing device. The thickness of the main part 2, for example, is 4 mm, and the radius of curvature of the folding part 34C when the display portion 3 is wound around the main part 2 is set to 2 mm. However, the specific numerical values are examples, and the present embodiment is not limited to the above descriptions.

As illustrated in FIG. 1 to FIG. 6, the support body 34 has a size roughly two times that of the main part 2 in the longitudinal direction. Consequently, a flexible device 1 according to the present embodiment, in a plan view, has a size roughly two times that of the main part 2 in the longitudinal direction of the display portion 3.

More specifically, the support body 34 has a size extending from the side surface on the connecting part 4 side of one main surface of the main part 2 (that is, either the information input surface 2a or the rear surface 2b), through the side surface of the side opposite the connecting part 4 in a plan view, to the end portion on the connecting part 4 side of the other main surface of the main part 2. That is, the first support part 34A and second support part 34B have sizes roughly the same as each main surface of the main part 2 in a plan view.

The folding part 34C of the support body 34, for example, may be formed with a flexible hinge, or a living hinge.

For example, in a case that the cover member 33 is formed of metal or plastic, the cover member 33 is provided by laser pattern machining and the like with a plurality of holes parallel to the folding axis 35 not illustrated in drawings, acting as a living hinge at the folding part 34C. In which case, the size of the holes is not particularly limited, but for example, the size may be 10 mm (opening length parallel to the folding axis 35)×0.4 mm (opening length perpendicular to the folding axis 35)×0.3 mm (hole depth, that is, the thickness of the cover member 33).

Furthermore, the size of the holes does not need to be uniform. The holes may be formed such that the opening length is smaller at positions relatively far from the folding axis 35 than positions relatively close to the folding axis 35. In addition, although not illustrated, at the folding part 34C, the cover member 33 may be thinner, or as described above, the cover member 33 may be formed of a soft material, thereby, a V-shaped groove or recessed portion is formed in the front surface of the cover member 33 on the side opposite the flexible display 31.

In addition, at the folding part 34C, the core 32 may be thinner than the first support part 34A and second support part 34B, or the core 32 is removed around the folding axis 35 with the folding axis 35 as a center, thereby, the core 32 is formed only on the first support part 34A and second support part 34B, so that a V-shaped groove or recessed portion is formed on the front surface of the core 32 on the side opposite the flexible display 31.

In the flexible device 1, folding the display portion 3 at the folding part 34C, makes possible 360 degrees folding (rotating) of the flexible display 31 around the folding axis 35 as a center.

Furthermore, here, "makes possible 360 degrees folding of the flexible display 31 around the folding axis 35 as a center" refers to be that, in the display portion 3, one of the mutually adjacent sections of the display portion 3 interposing the folding axis 35 of the folding part 34C configured to freely rotate, between a state of the section superimposing the other section with the flexible display 31 on the inside, and a state of the section superimposing the other section with the flexible display 31 on the outside.

According to the present embodiment, the display portion 3 configured to freely rotate between the states. In one such state, as illustrated in FIG. 1 and FIG. 4, the mutually adjacent first display region 31A and second display region 31B of the flexible display 31 mutually interpose the folding axis 35, in a region other than the folding part 34C, mutually opposing in parallel (face to face) via a fixed gap corresponding to the radius of curvature of the folding part 34C (namely, a gap of length two times that of the radius of curvature), with the support body 34 on the outside and the flexible display 31 on the inside. In the other such state, as illustrated in FIG. 5 and FIG. 6, the mutually adjacent first support part 34A and second support part 34B of the support body 34 interpose the folding part 34C mutually opposing in parallel (face-to-face) via a fixed gap corresponding to the radius of curvature of the folding part 34C (namely, a gap of length two times that of the radius of curvature), with the flexible display 31 on the outside and the support body 34 on the inside.

Namely, in the flexible device 1, folding the display portion 3 at the folding part 34C, makes possible 360 degrees rotating of the second display region 31B relative to the first display region 31A, through the state of 180 degrees expanding relative to the first display region 31A.

The display portion 3 is connected to the main part 2 by a connecting part 4 which is flexible. As illustrated in FIG. 1 and FIG. 3 to FIG. 6, the connecting part 4 is a flexible hinge including a flexible printed circuit (FPC) substrate 41 having a wiring line configured to supply various signals to the flexible display 31 from the main part 2. The FPC board 41, for example, has a configuration in which a circuit pattern is formed on a flexible thin film. The front surface of the FPC board 41 is formed with a cover layer 42 having flexibility, covering at least the circuit pattern exposed on the outside. As illustrated in FIG. 3, the FPC board 41 is electrically connected to the mounting board 23 on the inside of the main part 2 and the drive circuit of the flexible display 31, configured to supply various signals from the main part 2 to the flexible display 31.

The connecting part 4, as illustrated in FIG. 1 for example, is drawn outside from one side surface of the main part 2. Specifically, the connecting part 4 is coupled to the main part 2 in the middle of one side surface of the main part 2 in the thickness direction. The connecting part 4 is formed to be freely rotatable on the information input surface 2a side and rear surface 2b side of the main part 2. That is, the flexible device 1 makes possible 360 degrees folding (rotating) of either the main part 2 or display portion 3 relative to the other, the connecting part 4 acting as the axis of rotation.

Furthermore, here, "makes possible 360 degrees folding of either the main part 2 or display portion 3 relative to the other" refers to either the main part 2 or display portion 3 freely rotating between states relative to the other. In one such state, as illustrated in FIG. 1 and FIG. 5, the sections of the display portion 3 adjacent to the main part 2 via the connecting part 4 (specifically, the cover member 33 on the first support part 34A) touch the information input surface 2a of the main part 2. In the other such state, as illustrated in FIG. 4, the sections of the display portion 3 adjacent to the main part 2 via the connecting part 4 (specifically, the first display region 31A of the flexible display 31) touches the rear surface 2b of the main part 2.

Namely, in the flexible device 1, folding the connecting part 4, makes possible 360 degrees rotating of the display portion 3, through the state of 180 degrees expanding relative to the main part 2.

The degree of folding (curvature) of the connecting part 4 is not particularly limited, but the flexible device 1 according to the present embodiment is an ultra-thin type information processing device. In a case where the thickness of the main part 2, for example, is 4 mm as described above, the radius of curvature of the connecting part 4 is set, for example, to 1 mm, when the display portion 3 is wound around the main part 2 by folding the connecting part 4 drawn from the middle of one side surface of the main part 2 in the thickness direction.

In addition, in the present embodiment, as an example, in a case that the thickness of the display portion 3 is 1.5 mm, and the thickness of the main part 2 is 4 mm as described above, the thickness of the flexible device 1 is set to 7 mm when folding the flexible device 1 as illustrated in FIG. 4 and FIG. 5 for example. However, the specific numerical values are examples, and the present embodiment is not limited to the above descriptions.

Thereby, the flexible device 1 makes possible free folding of the display portion 3, at either the connecting part 4 or folding part 34C. Thus, the flexible device 1, as illustrated in FIG. 1 to FIG. 10B for example, can be variously deformed, and a single device can be used in different styles (modes).

Usage Mode

Here, usage modes of the flexible device 1 will be described below, prior to describing the magnets 5 and adsorption parts 6.

Figure 7A:
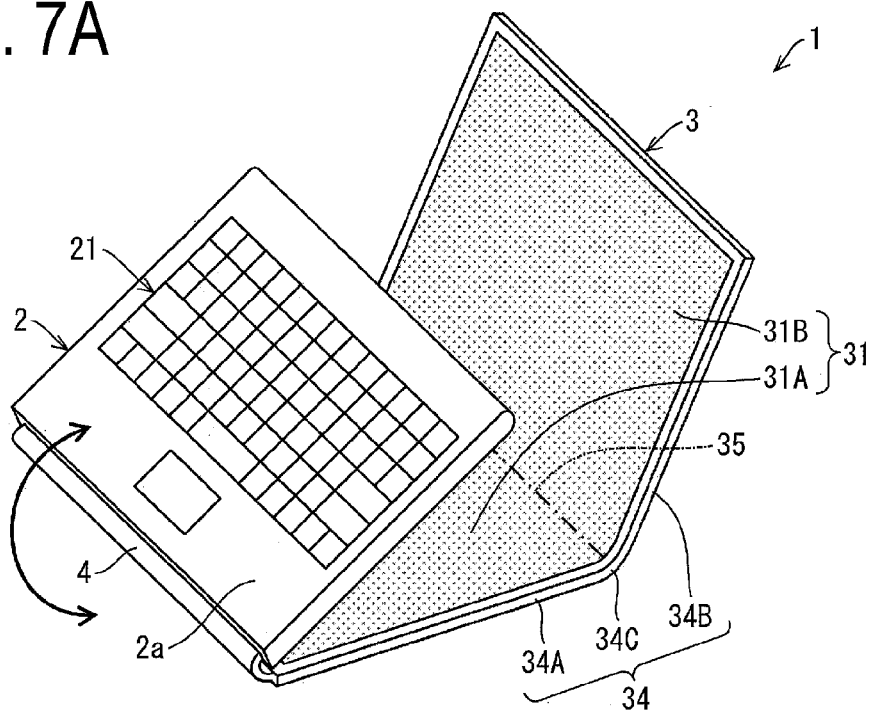
FIG. 7A is a perspective view illustrating a flexible device according to an embodiment of the disclosure, in a halfway state of folding the main part, such that it switches between a notebook style and a seamless dual screen style.
Figure 7B:
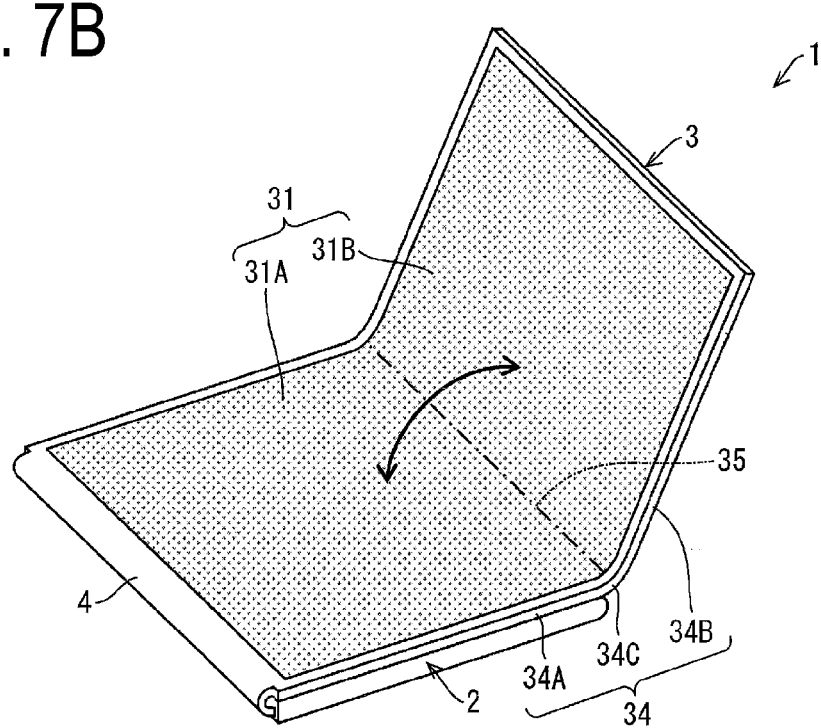
FIG. 7B is a perspective view illustrating a flexible device according to an embodiment of the disclosure, in a halfway state of switching from a seamless dual screen style to a large screen tablet style.
Figure 8A:
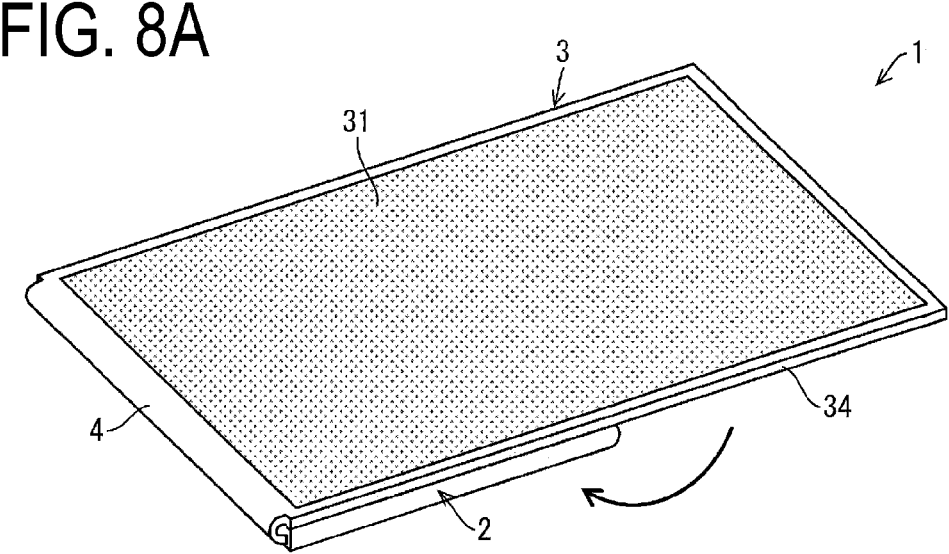
FIG. 8A is a perspective view illustrating the appearance of a flexible device according to an embodiment of the disclosure in large screen tablet style.
Figure 8B:
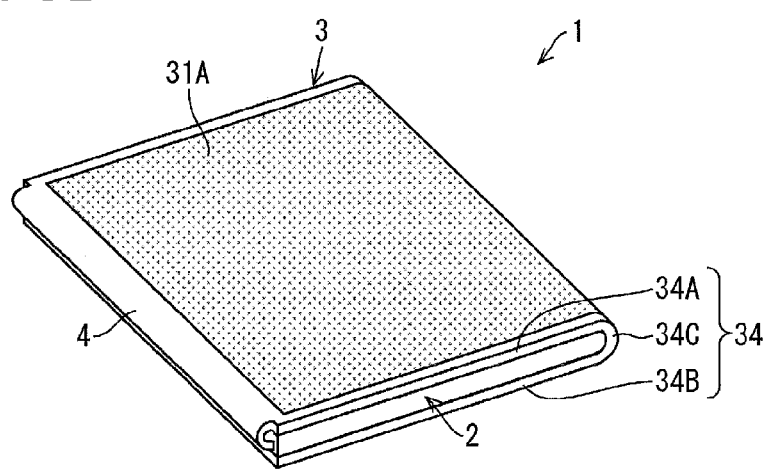
FIG. 8B is a perspective view illustrating the appearance of a flexible device according to an embodiment of the disclosure in small screen tablet style.
Figure 9A:
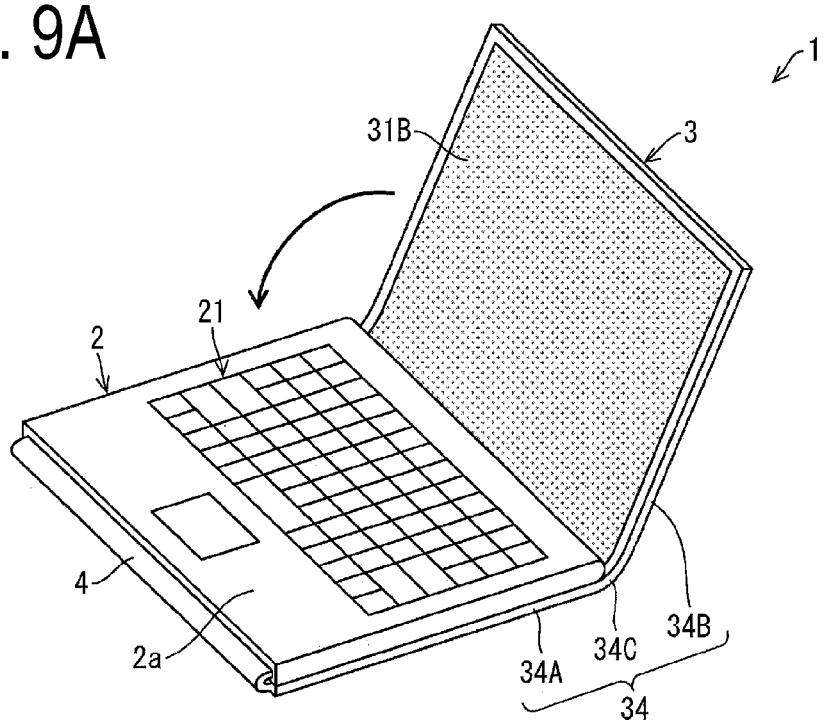
FIG. 9A is a perspective view illustrating the appearance of a flexible device according to an embodiment of the disclosure in notebook style.
Figure 9B:
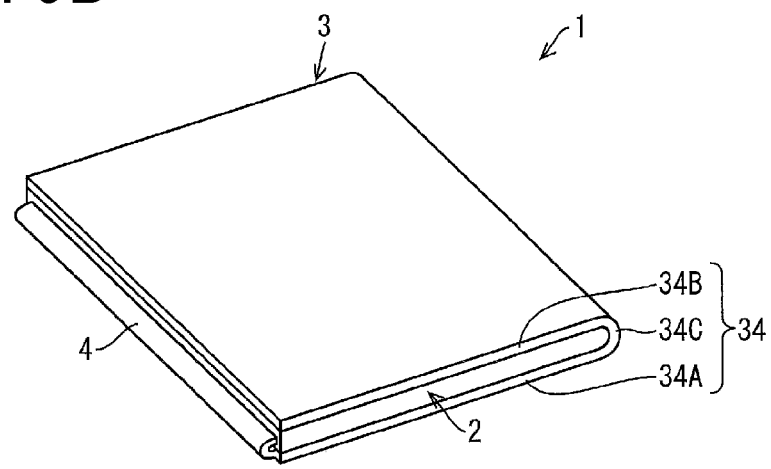
FIG. 9B is a perspective view illustrating the appearance of a flexible device according to an embodiment of the disclosure in storage style.
Figure 10A:
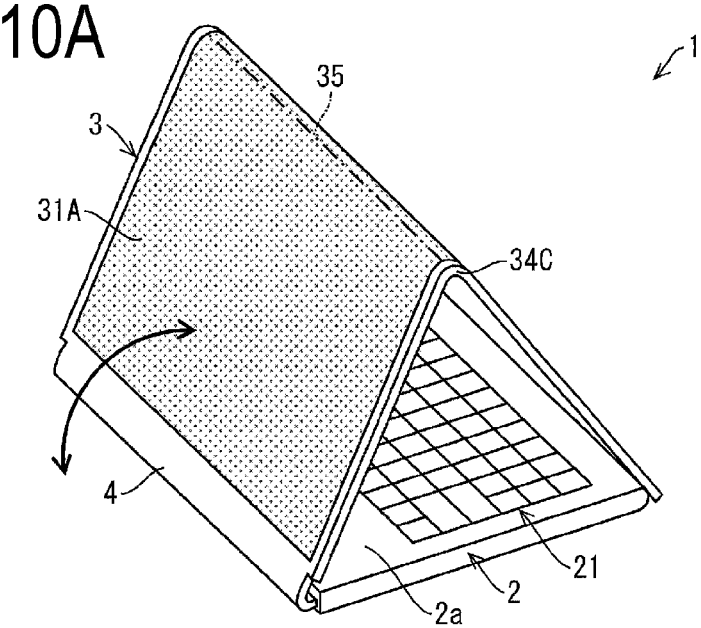
FIG. 10A and FIG. 10B are perspective views illustrating the appearance of a flexible device according to an embodiment of the disclosure in presentation style viewed from mutually different angles.
Figure 10B:
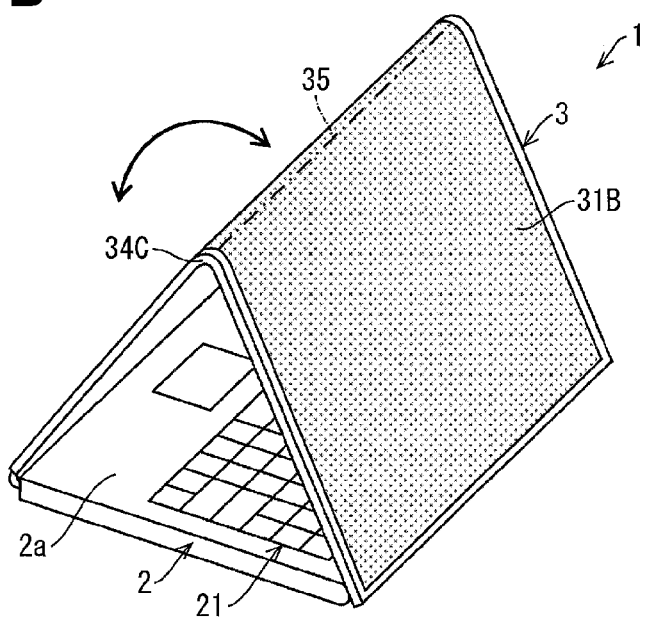

FIG. 7A is a perspective view illustrating a flexible device 1, in a halfway state of folding the main part 2, such that it switches between a notebook style and a seamless dual screen style. FIG. 7B is a perspective view illustrating a flexible device 1, in a halfway state of switching from a seamless dual screen style to a large screen tablet style. FIG. 8A is a perspective view illustrating the appearance of a flexible device 1 in large screen tablet style. FIG. 8B is a perspective view illustrating the appearance of a flexible device 1 in small screen tablet style. FIG. 9A is a perspective view illustrating the appearance of a flexible device 1 in notebook style. FIG. 9B is a perspective view illustrating the appearance of a flexible device 1 in storage style. FIG. 10A and FIG. 10B are perspective views illustrating the appearance of a flexible device 1 in presentation style viewed from mutually different angles.

Furthermore, for the sake of convenience, FIG. 7A to FIG. 10B omit the magnets 5 and adsorption parts 6.

Here, notebook style, as illustrated in FIG. 7A and FIG. 9A, is a usage mode folding the connecting part 4, such that the main part 2 is disposed on the flexible display 31, thereby folding the main part 2 on the upper surface side of the display portion 3 with the information input surface 2a on the upper surface side.

In notebook style, as illustrated in FIG. 9A, the main part 2 rotates around the connecting part 4 as a center, and the second support part 34B is fixed in a state of folding at an arbitrary angle relative to the first support part 34A, such that the rear surface 2b of the main part 2 touches the first display region 31A of the flexible display 31.

Thereby, in notebook style, an information input portion 21 such as a key input operation part like a keyboard and the like or a pad portion and the like can be used. The flexible device 1 is used as a notebook-type information processing device with the second display region 31B of the flexible display 31 serving as a display screen.

In addition, seamless dual screen style is a usage mode, folding the main part 2 from the state illustrated in FIG. 7A to the side opposite the flexible display 31 of the display portion 3, such that the information input surface 2a touches the first support part 34A. In this state, as illustrated in FIG. 7B, the display portion 3 is folded or expanded within the range that the first display region 31A and second display region 31B are viewable as a single viewing surface.

Namely, in seamless dual screen style, the first support part 34A and second support part 34B are fixed at an arbitrary angle, thereby the first display region 31A and second display region 31B can be used as a single display screen.

In seamless dual screen style, in a case that the flexible display 31 includes a touch panel function, information is input by touching the flexible display 31. In seamless dual screen style, for example, the flexible device 1 can be used as a notebook-type information processing device, the first display region 31A serving as an information input portion 21, and the second display region 31B serving as a display screen.

Large screen tablet style refers to a usage mode wherein, as illustrated in FIG. 8A, a display portion 3 in seamless dual screen style is expanded 180 degrees such that it is fully flattened.

Namely, large screen tablet style refers to a state where the main part 2 folded to the side opposite the flexible display 31 of the display portion 3 as illustrated in FIG. 7B, rotating the second support part 34B, such that the first display region 31A and second display region 31B are flush.

Small tablet style refers to a mode of folding the display portion 3 from the mode illustrated in FIG. 8A to interpose the main part 2, such that the flexible display 31 is facing outside as illustrated in FIG. 8B. Thus, refers to a usage mode where the flexible display 31 being respectively disposed on the front and rear surfaces of the flexible display 1, displaying approximately half the screen in large screen tablet style within the same plane.

Namely, in small tablet style, the main part 2 in a state of being folded to the side opposite the flexible display 31 of the display portion 3 as illustrated in FIG. 7B, is rotated such that the second support 34B touches the rear surface 2b of the main part 2, through a state of expanding the display portion 3 180 degrees as illustrated in FIG. 8A, thereby the display portion 3 is folded such that the display portion 3 winds around the main part 2 with the flexible display 31 on the outside. Thereby, the main part 2 is interposed on the inside of the display portion 3 with the flexible display 31 on the outside.

Presentation style, as illustrated in FIG. 10A and FIG. 10B, refers to a usage mode in a triangular prism shape with no bottom surface and one side surface resting laterally (namely, a desktop-type dual screen calendar shape), where the main part 2 is arranged on the bottom with the information input surface 2a as the upper surface side, folding the display portion 3 into a chevron shape with the support body 34 facing inside to cover above the main part 2, the flexible display 31 facing outside.

Namely, presentation style refers to a state of folding the display portion 3 from the state illustrated in FIG. 7B or FIG. 8A, such that the end portion of the support body 34 on the side opposite the connecting part 4 in a plan view is disposed on the end portion of the main part 2 on the side opposite the connecting part 4 in a plan view.

The end portion of the support body 34 on the side opposite the connecting part 4 in a plan view, and the end portion of the main part 2 on the side opposite the connecting part 4, may be provided, for example, with a recessed portion not illustrated in drawings on one, and a protruding portion not illustrated in drawings fitting the recessed portion on the other. Thereby, the main part 2 and display portion 3 may be fixed.

In presentation style, the flexible device 1 is used as a double display. The first display region 31A and second display region 31B are individually viewable to respective face-to-face users interposing the flexible device 1.

Storage style refers to a state of, as illustrated in FIG. 9B, folding the display portion 3 from the notebook style illustrated in FIG. 9A, such that the second display region 31B of the flexible display 31 touches the information input surface 2a of the main part 2. As illustrated in FIG. 9B, in storage style, the display portion 3 is folded such that it winds around the main part 2 with the flexible display 31 on the inside. Thereby, the main part 2 is interposed on the inside of the display portion 3 with the flexible display 31 on the outside.

The flexible device 1 includes a sensor not illustrated in drawings to determine whether the main part 2 and the display portion 3 are folded. Based on the results determined by this sensor, the display mode switches between the first display region 31A and second display region 31B, such that the display mode corresponds to the usage mode.

Furthermore, in small tablet style, either the first display region 31A, the second display region 31B, or both may be used for display. A touch panel may be used to switch to the display region (display screen) used for display.

Magnets 5 and Adsorption Parts 6

FIG. 4 is a cross-sectional view of a flexible device 1 in the storage style illustrated in FIG. 9B. FIG. 5 is a cross-sectional view of a flexible device 1 in the small tablet style illustrated in FIG. 8B.

FIG. 1 is a cross-sectional view of a flexible device 1, in a state of folding the display portion 3, from the seamless dual screen style illustrated in FIG. 7B, on the main part 2 in the direction indicated by the counterclockwise arrow in FIG. 7B, thereby closing the display screen, such that the flexible display 31 is disposed on the inside of the flexible device 1.

FIG. 6 is a cross-sectional view of a flexible device 1, in a state of rotating the display portion 3, from the presentation style illustrated in FIG. 10A and FIG. 10B, in the direction indicated by the counterclockwise arrow in FIG. 10A and FIG. 10B, thereby folding the display portion 3 lateral to the main part 2 with the flexible display 31 on the outside.

As illustrated in FIG. 4 or FIG. 5, in storage style and small tablet style, the display portion 3 is folded around the main part 2 and along the front surface of the main part 2, as the display portion 3 winds around the main part 2 having rigidity and a sheet-like shape. Thus, the display portion 3 is folded with the thickness of the main part 2, or the thickness of the support body 34 added to the thickness of the main part 2 (thickness of the cover member 33 in the example illustrated in FIG. 6), serving as the radius of curvature.

In the present embodiment, the connecting part 4 and folding part 34C are respectively provided freely folding (freely rotating). thereby, as described above, it is possible to fold the display portion 3 such that it winds around the main part 2 having rigidity and a sheet-like shape, and avoid the problem of excess load applied to the folding part 34C and creasing the flexible display 31 by folding the display portion 3 to wind around the main part 2.

On the other hand, in the state illustrated in FIG. 1, the display portion 3 is folded such that the first display region 31A and the second display region 31B directly face each other without the main part 2 therebetween. In addition, in the mode illustrated in FIG. 6, the display portion 3 is folded such that the first support part 34A and the second support part 34B directly face each other without the main part 2 therebetween. Thus, in the examples illustrated in FIG. 1 and FIG. 6, no inclusion is present between the first display region 31A and second display region 31B at the folding part 34C, or if present, there is only a thin support body 34 (thin cover member 33 in the example illustrated in FIG. 6).

Thus, as illustrated in FIG. 1 and FIG. 6, in a case that the display portion 3 is folded without the main part 2 therebetween, and excess load is applied to the folding part 34C, there is a risk of damage to the flexible display 31 such as creasing in the flexible display 31.

Therefore, in the present embodiment, when folding the display portion 3 at the folding part 34C, the plurality of magnets 5 are respectively arranged on the first support part 34A and second support part 34B, such that the same magnetic poles mutually face, overlap and repel each other, Namely, as illustrated in FIG. 2A and FIG. 2B, in a state where the display portion 3 not being folded (that is, the display portion 3 extended state), in a plan view, the magnets 5 acting as a magnetic force generating source are arranged with surfaces having the same magnetic poles facing the same direction, at mutually opposing positions on the display portion 3 interposing the folding axis 35, in other words, line symmetrical positions with the folding axis 35 as the center.

The magnets 5 include S poles 5S and N poles 5N. In the present embodiment, as illustrated in FIG. 1 to FIG. 6, an example is given of magnets 5 arranged on the core 32, such that N poles 5N are disposed on the flexible display 31 side, that acts as the rear surface 2b side of the main part 2, and S poles 5S disposed on the side opposite the flexible display 31 (namely, the side facing the cover member 33). However, they may be arranged in reverse (namely, S poles 5S disposed on the flexible display 31 side, and N poles 5N disposed on the side opposite the flexible display 31).

That is, the magnets 5 may be arranged with surfaces having the same magnetic pole facing the same direction, such that either only N poles or S poles are disposed on the flexible display 31 side, and the only opposing poles are disposed on the side opposite the flexible display 31. The magnets 5 may also be arranged such that, when the display portion 3 is not being folded, surfaces of the magnets 5 having the same magnetic poles face the same direction.

In the present embodiment, as illustrated in FIG. 1 to FIG. 6, in a plan view, magnets 5 are arranged at the four corners of the first support part 34A and the four corners of the second support part 34B, line symmetrically with the folding axis 35 as the center. Each magnet 5 is also arranged such that surfaces having the same magnetic poles face the same direction when the display portion 3 is not being folded.

Thus, the magnets 5 forming the pair of magnets which are symmetrically arranged with the folding axis 35 as the center, when the display portion 3 is folded at the folding part 34C, surfaces of the magnets forming the pair of magnets having the same magnetic poles oppose each other.

Consequently, as illustrated in FIG. 1 and FIG. 6, in a case that the display portion 3 is folded without the main part 2 therebetween, such that one part of the flexible display 31 opposes the other part (for example, the first display region 31A and second display region 31B of the flexible display 31), a repelling force (magnetic repulsion force) is generated between the magnets 5 provided on the first support part 34A opposing the first part, and the magnets 5 provided on the second support part 34B opposing the other part. Due to this repelling force, the second support part 34B is lifted from the first support part 34A, and a space is created in the flexible display 31 between the first display region 31A and the second display region 31B. For example, in the example illustrated in FIG. 1, the flexible display surface of the mutually adjacent sections interposing the folding part 34C, float above the flexible display surface of the other section, preventing the display screens from directly touching each other. Furthermore, here, "one part of the flexible display 31 opposes the other part" refers to one part and the other part of the flexible display 31 directly opposing without the main part 2 therebetween.

Thereby, according to the present embodiment, the magnets 5 are provided, making it less likely for a load to be applied to the folding part 34C, and possible to reduce the load on the folding part 34C.

Thus, according to the present embodiment, it is possible to prevent damage to the flexible display 31 such as creasing in the flexible display 31 at the folding part 34C, and ensure the long-term durability of the flexible device 1.

The folding part 34C is provided such that one of the mutually adjacent sections of the display portion 3 interposing the folding axis 35 freely rotates between a state of the display portion 3 superimposing the other section with the flexible display 31 on the inside, and a state of the display portion 3 superimposing the other section with the flexible display 31 on the outside.

In a case that the magnets 5 are not provided, the display portion 3 can be folded at the folding part 34C such that at least one of the mutually adjacent sections of the display portion 3 interposing the folding axis 35 touches at least portion of the front surface of the other section (first surface) or at least portion of the rear surface (second surface).

However, in the present embodiment, as described above, in a plan view, each of the magnets 5 are provided at the four corners of the first support part 34A and the four corners of the second support part 34B, such that when the display portion 3 is folded at the folding part 34C, each of the magnets 5 mutually face, overlap, and repel each other. Thus, as illustrated in FIG. 1 for example, it is possible to dispose one of the mutually adjacent sections of the display portion 3 interposing the folding axis 35 of the folding part 34C opposing the other section, via a fixed gap in a section other than the folding part 34C with the flexible display 31 on the inside. In addition, as illustrated in FIG. 6, it is possible to dispose one of the mutually adjacent sections of the display portion 3 interposing the folding axis 35 of the folding part 34C opposing the other section, via a fixed gap in a section other than the folding part 34C with the flexible display 31 on the inside. Therefore, it is possible to rotate one of the sections with the folding part 35 as the center, between the two states illustrated in FIG. 1 and FIG. 6. Thus, it is possible to reduce the load applied to the folding part 34C.

In addition, as magnetic repulsion force from the magnets 5 is acting between one section and the other section, and when the display portion 3 is folded without the main part 2 therebetween, a user can sense the magnetic repulsion force, and is alerted to excessive folding of the display portion 3.

Furthermore, the shape of the magnets 5 is not particularly limited. In FIG. 1 to FIG. 6, the magnets 5, for example, are flat disk shape (coin-shaped). However, they may be rectangular shape or long, narrow plate shape. Naturally, other shapes are also possible.

In addition, the size of the magnets 5 is not particularly limited. However, increasing the surface area of the magnets 5 leads to increased weight, and increasing the thickness of the magnets leads increased thickness of the flexible device 1. Therefore, the magnets 5 are preferably as thin and small as possible, to provide a thin and lightweight flexible device 1.

In the present embodiment, as an example, flat disk shape magnets 5 having 10 mm in diameter and 1 mm in thickness are used for a display portion 3 having 7 mm in thickness, including a 170 mm×260 mm rectangular-shaped first support part 34A and second support part 34B in a plan view. However, the present embodiment is not limited thereto.

In addition, the magnetic force of the magnets 5 is not particularly limited. However, the magnets 5 preferably generate a magnetic force of such magnitude that, the radius of curvature of the first display region 31A and second display region 31B is not smaller than when mutually opposing each other via a fixed gap corresponding to the radius of curvature of the folding part 34C (namely, the degree of folding is not larger), in a section other than the folding part 34C.

Thus, the magnets, for example, preferably generate magnetic repulsion force such that the curvature of radius is not less than 2 mm.

Furthermore, the magnetic force of each of the magnets 5 may be same or different. However, the magnets 5 preferably have the same magnetic force, such that one of the mutually adjacent sections of the display portion 3 interposing the folding axis 35 of the folding part 34C can oppose the other in parallel via a fixed gap.

In addition, the arrangement of the magnets 5 is not particularly limited. However, the magnets 5 are preferably provided at positions such that, when the display portion 3 is folded at the folding part 34C without the main part 2 therebetween, the radius of curvature of the folding part 34C is not smaller than when the display portion 3 is folded at the folding part 34C interposing the main part 2 therebetween.

The magnets 5, for example, may be fixed to the support body 34 by embedding into holes or recessed portions formed in the core 32, or integrally formed with the core 32 by insert molding. However, the method of fixing the magnets 5 is not limited to the above descriptions.

The main part 2, as illustrated in FIG. 1, FIG. 4 and FIG. 5, preferably includes at least one adsorption part 6 including a magnetic material that is magnetically adsorbed to the magnets 5, provided within the range of the magnetic field of at least one of the at least one pair of the magnets 5, when the connecting part 4 is folded such that the main part 2 and display portion 3 are opposing.

In the present embodiment, when the connecting part 4 is folded such that the main part 2 and display portion 3 are opposing, the adsorption parts 6 are respectively provided at positions respectively opposing each of the magnets 5. Thus, in the present embodiment, in a plan view, the adsorption parts 6 are provided, for example, at the four corners of the main part 2.

In addition, in the present embodiment, as described above, the connecting part 4 is formed freely rotating on the information input surface 2a side and rear surface 2b side of the main part 2. Thus, in the present embodiment, as illustrated in FIG. 4 and FIG. 5, when folding the display portion 3 at the folding part 34C interposing the main part 2 therebetween, the adsorption parts 6 are respectively provided at positions respectively opposing each of the magnets 5. Thus, in the present embodiment, the adsorption parts 6 are respectively provided on the information input surface 2a side and rear surface 2b side of the main part 2. The adsorption parts 6 provided on the information input surface 2a side of the main part 2, and the adsorption parts 6 provided on the rear surface 2b side of the main part 2, are provided mutually superimposing. Thus, in the present embodiment, respective pluralities (for example, two) of adsorption parts are provided for each pair of magnets 5. In the present embodiment, a total of eight adsorption parts 6 are respectively provided, for example, at the four corners of the main part 2, facing the information input surface 2a side and the rear surface 2b side.

The magnetic material may be a material magnetically adsorbed to the magnets 5. For example, a magnetic metal such as iron, nickel, invar (iron-nickel alloy), or SUS430, or an iron oxide such as $Fe_2O_3$ or $Fe_3O_4$, or a magnet of magnetic ceramic and the like including a magnetic ceramic material such as ferrite containing iron oxides such as $Fe_2O_3$ or $Fe_3O_4$.

Furthermore, the magnets 5 (first magnets) and magnets used for the adsorption parts 6 (second magnets) may be magnets including the same material, or magnets including different materials.

Furthermore, in a case where the adsorption parts 6 are formed by magnets, the magnets 5 and adsorption parts 6 are arranged such that surfaces having different magnetic poles face the same direction when the flexible device 1 is expanded 180 degrees, and thus surfaces having different magnetic poles oppose when the display portion 3 is folded at the folding part 34C interposing the main part 2 therebetween.

As described above, the adsorption parts 6 are preferably provided respectively on the information input surface 2a side and rear surface 2b side in the main part 2. However, they may be provided on only one side of the information input surface 2a side and rear surface 2b side, and are not necessarily essential.

However, the adsorption parts 6 being provided on the main part 2 as described above, when lifting or standing the flexible device 1 in a style, for example, with part of the display portion 3 and part of the main part 2 mutually touching, such as notebook style, seamless dual screen style, large screen tablet style, small screen tablet style, and storage style, the style is easily maintained without the display portion 3 opening, or without the display portion 3 or main part 2 floating up toward the other.

Furthermore, the adsorption parts 6, depending upon the material or thickness of the housing, may be provided on the housing 22 in an exposed state facing outside, or within the housing 22 by considering design and the like.

In addition, the shape and size of the adsorption parts 6, similar to the magnets 5, is not particularly limited. The size and arrangement of the adsorption parts 6 can be freely designed as long as in a range where the magnetic attraction force acting between the magnets 5 and adsorption parts 6 can magnetically adsorb the main part 2 and display portion 3.

First Modified Example

Furthermore, in the present embodiment, as illustrated in FIG. 1 to FIG. 6, an example was described wherein the flexible device 1 is expanded 180 degrees, and in a plan view, the magnets 5 forming the pairs of magnets are provided on the first support part 34A and second support part 34B, at line symmetrical positions with the folding axis 35 (central axis) of the folding part 34C as the center, thereby, when the display portion 3 is folded at the folding part 34C, the magnets 5 forming the pairs of magnets are arranged at mutually superimposing positions.

However, the magnets 5 provided on the first support part 34A, and the magnets 5 provided on the second support portion 34B, do not necessarily oppose when the display portion 3 is folded at the folding part 34C.

It suffices that each magnet 5 is provided in a range that, when the display portion 3 is folded at the folding part 34C, repulsion force is produced between the magnets 5 provided on the first support part 34A, and the magnets 5 provided on the second support part 34B (namely, within a range of each magnetic field).

However, to increase repulsion force, the magnets 5 forming the pairs of magnets generating repulsion force are preferably provided at positions as close as possible. Thus, the magnets 5 forming the pairs of magnets, when the display portion 3 is folded at the folding part 34C, are preferably provided at mutually superimposing positions each other.

Similarly, in the present embodiment, an example was described wherein the magnets 5 and the adsorption parts 6 forming the pairs, in a plan view, are provided on the main part 2 and the first support part 34A, at line symmetrical positions with the rotating axis (central axis) of the connecting part 4 as the center. Thus, when the display portion 3 is folded at the folding part 34C, the magnets 5 and the adsorption parts 6 forming the pairs are arranged at mutually superimposing positions each other. However, the present embodiment is not particularly limited.

It suffices that the adsorption parts 6, when the display portion 3 is folded at the folding part 34C, is provided in a range of the magnetic field of the magnets 5.

However, to increase the adsorption force of the main part 2 and display portion 3, the magnets 5 and the adsorption parts 6 forming the pairs with magnetic attraction force acting therebetween, are preferably provided at positions as close as possible. Thus, the magnets 5 and the adsorption parts 6 forming the pairs, when the display portion 3 is folded at the folding part 34C interposing the main part 2 therebetween, are preferably provided at mutually superimposing positions.

Second Modified Example

In addition, in the present embodiment, an example was described wherein respective magnets 5 are arranged at the four corners of the first support part 34A and the four corners of the second support part 34B, but this embodiment is not particularly limited.

Figure 11:
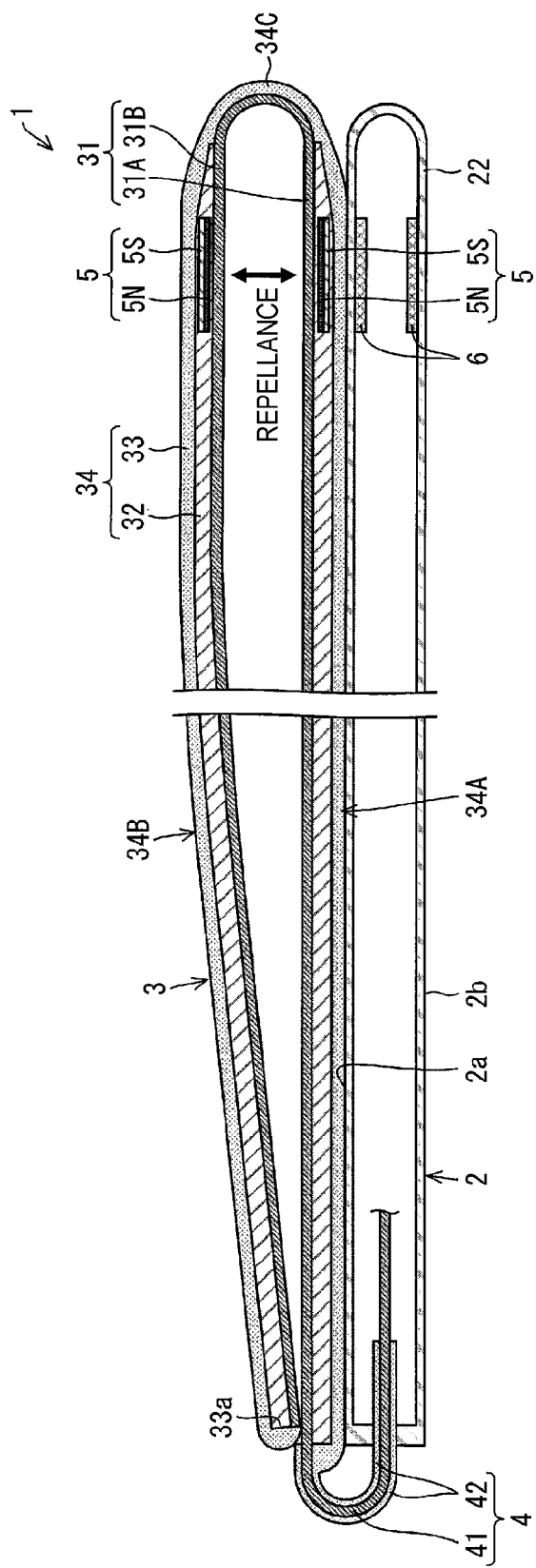
FIG. 11 is a partial cross-sectional view illustrating the schematic configuration of a flexible device according to a second modification of the disclosure, folding the display portion such that it winds around the main part with the flexible display on the inside.

FIG. 11 is a partial cross-sectional view illustrating the schematic configuration of a flexible device 1 according to a second modification example, when the flexible device 1 is folded such that the display portion 3 is wound around the main part 2 with the flexible display 31 on the inside.

Although depending on the size of the flexible device 1, the size and shape of the magnets 5, arrangement positions of the magnets 5 and the like, it suffices that at least a pair of magnets 5 are provided.

Namely, as long as the magnets 5 are arranged such that, when the display portion 3 is folded without interposing the main part 2 therebetween, the radius of folding of the folding part 34C is not smaller than when folding the display portion 3 interposing the main part 2 therebetween, the magnets 5, for example, may be respectively provided in a plan view on the first support part 34A and second support part 34B, at each on the end portion of the folding part 34C side and the opposing end portion on the side opposite the folding part 34C, or, as illustrated in FIG. 11, only on one of these ends.

In addition, as long as the magnets 5 are arranged such that, when the folding part 3 is folded without interposing the main part 2 therebetween, the radius of folding of the folding part 34C is not smaller than when folding the display portion 3 interposing the main part 2 therebetween, part of one of the mutually adjacent sections of the display portion 3 interposing the folding axis 35 (for example, the end portion on the side opposite the folding axis 35 in a plan view), may touch or be adjacent to the corresponding part of the other section as illustrated in FIG. 11.

Third Modification Example

In addition, the flexible device 1 may include a stand not illustrated in drawings. Depending on the configuration of the folding part 34C, for example, in seamless dual screen style and notebook style, the stand may be used to assist self-supporting in a state where the second support part 34B is bent relative to the first support part 34A. In other words, the second support part 34B may be fixed at an arbitrary angle relative to the first support part 34A with the stand.

Stand adsorption magnets (third magnets) or magnetic metal are embedded in the surface of the side opposite the flexible display, such that they are flush with the cover member 33. Using magnetic metal adsorbed to the stand adsorption magnets (third magnets), stand adsorption magnets (fourth magnets) adsorbed to the stand adsorption magnets (third magnets) or magnetic metal in the parts of the stand touching the support 34, the stand may be detachably provided on the support body 34 such that it can be mounted by magnetic force and removed. Furthermore, if stand adsorption magnets (third magnets) are provided on the support body 34 side, the stand adsorption magnets (third magnets) and magnets 5 are preferably arranged such that surfaces having the same magnetic poles are facing the same direction.

In addition, one end of the stand may be rotatably fixed to the support body 34 on the surface of the side opposite the flexible display, such that it has a standing state and a reclining state. In which case, a recessed portion matching the external form of the stand is provided in the support body 34 on the surface of the side opposite the flexible display, and the stand may be embedded in the support 34, such that, in a reclining state, the surface of the stand is flush with the cover member 33.

Fourth Modification Example

In addition, in the present embodiment, an example is described, the display portion 3 having a size roughly two times that of the main part 2, and one bending part 34C provided in the middle section of the display portion 3 in the longitudinal direction as dividing the display portion 3 in the longitudinal direction.

However, the present embodiment is not particularly limited, and may have a configuration wherein the display portion 3 has a size roughly three times or greater than that of the main part 2, and a plurality of folding parts 34C are provided on the display portion 3. That is, it suffices that at least one folding part 34C is provided on the display portion 3.

In which case, magnets 5 are arranged on the display portion 3 with surfaces having the same magnetic poles facing the same direction, such that either N poles or S poles are disposed on the flexible display 31 side, and the opposite poles are disposed on the side opposite the flexible display 31. When the display portion 3 is folded interposing the main part 2 therebetween, the application of an excessive load on the folding part 34C is prevented by the main part 2. Furthermore, when the display portion 3 is folded without interposing the main part 2 therebetween such as in a U shape or wave shape (an S shape, for example), the application of an excessive load on the folding part 34C is prevented by the magnetic repulsion force of the magnets 5. Thus, in which case, it is possible to prevent damage to the flexible display 31, such as creasing in the flexible display 31 at the folding part 34.

Furthermore, a case considered that when the display portion 3 has a size roughly three times that of the main part 2 or greater, and a plurality of folding parts 34C is provided on the display portion 3, for example, in large screen tablet style, the display portion 3 is folded such that it winds around in a spiral shape from the open end portion side of the display portion 3 (namely, the end portion on the side opposite the connecting part 4 in a plan view).

In which case, in the magnets 5 provided on the outer side support part, surfaces having different magnetic poles are opposing. Specifically, in a case where the display portion 3 is folded such that it winds around in a spiral shape, the magnets 5 have surfaces with different magnetic poles opposing from the second roll starting from the open end as a starting point. However, in which case, repulsion force acts between the magnets 5 forming the pairs of magnets at the first roll starting from the open end as a starting point. Thereby, at the folding part 34C of the first roll, as described above, for example, a radius of curvature is ensured achieving the same radius of curvature as when folding the display portion 3 interposing the main part 2 therebetween. From the second role or subsequent roles, though it depends on the magnetic force of the magnets 5, in a state where the radius of curvature is maintained, a section of the first role acts as a core, and the display portion is folded such that it winds around the core, achieving a larger radius of curvature. Thus, in which case, it is possible to prevent damage to the flexible display 31, such as creasing in the flexible display 31 at the folding part 34. Consequently, it is possible to ensure the long-term durability of the flexible device 1, not matter the situation.

Fifth Modification Example

In addition, in the present embodiment, in FIG. 1 or the like, for example, an example is illustrated of one continuous molded article, the support body 34 integrally formed of the first support 34A, folding part 34C, and second support part 34B by using the same material, not overlapping.

However, the present embodiment is not particularly limited, and the first support part 34A, folding part 34C, and second support part 34B may have a configuration respectively connecting separate and independent molded articles.

For example, the first support part 34A and second support part 34B may be configured being connected via a separate folding part 34C that is a part different from the first support part 34A and second support part 34B and respectively overlapping a portion of the first support part 34A and a portion of the second support part 34B.

That is, the folding part 34C is a single flexible hinge independent from the first support part 34A and second support part 34B. A single support body 34 may be configured connecting the first support part 34A, folding part 34C and second support part 34B. In which case, the folding part 34C can use a soft material such as silicone, rubber or fabric, and the folding part 34C may be formed of different material from the first support part 34A and second support part 34B.

Sixth Modification Example

In addition, in the present embodiment, an example is described of a flexible device (electronic device) according to the present embodiment that is an information processing device such as a personal computer, including a main part having a key input operating part. However, the present embodiment is not limited thereto.

The main part 2, for example, may be a telephone main body, television receiver, hard disk drive (HDD) recorder, digital versatile disc (DVD) recorder, Blu-ray (trade name) recorder, or the like. The flexible device 1 may be an electronic device such as a communication device, information recording and reproducing device, or information reproducing device.

Supplement

A flexible device 1 according to aspect 1 of the disclosure includes a main part having a plate-shape 2, a display portion 3, and a connecting part being flexible, and connecting the main part 2 with the display portion 3. The display portion 3 includes a flexible display 31, a support body 34 including at least one foldable folding part 34C and the flexible display 31 being laid straddling the folding part 34C, and at least a pair of magnets 5 being provided on the support body 34. At least the pair of magnets 5 being disposed to cause a repelling force to act between the magnets 5, when folding the display portion 3 such that one part (for example, a first display region 31A) and the other part (for example, a second display region 31B) of the flexible display 31 are opposing.

According to the present configuration, when the display portion 3 is folded without interposing the main part 2 therebetween, such that part of the flexible display 31 and the other part are opposing, a mutual repelling force (magnetic repulsion force) acts therebetween at least the pair of the magnets 5. Thus, one of the mutually adjacent sections of the display portion 3 interposing the folding axis 35 of the folding part 34C is in a floating state, making it less likely for a load to be applied to the folding part 34C, and possible to reduce the load on the folding part 34C.

Thus, it is possible to prevent damage to the flexible display 31 from creasing in the flexible display 31 at the folding part 34C, and ensure the long-term durability of the flexible device 1.

In addition, as magnetic repulsion force from the magnets 5 is acting between one section and the other section, and when the display portion 3 is folded without interposing the main part 2 therebetween, such that a part of the flexible display 31 and the other part are opposing, a user can sense the magnetic repulsion force, and is alerted to excessive folding of the display portion 3.

A flexible device 1 according to an aspect 2 of the disclosure, the main part 2 according to the first aspect, may be provided with at least one adsorption part 6 including a magnetic material adsorbed to the magnet 5, within the range of the magnetic field of at least one of the pair of magnets 5, when the connecting part 4 is folded such that the main part 2 and display portion 3 are opposing.

According to the present embodiment, when the connecting part 4 is folded such that the main part 2 and display portion 3 are opposing, at least one magnet 5 and adsorption part 6 are adsorbed, and part of the display portion 3 and part of the main part 2 mutually touch with a state where the magnet 5 and adsorption part 6 are adsorbed each other. Thus, according to the present configuration, when lifting or standing a flexible device 1 in a style (usage mode) with part of the display portion 3 and part of the main part 2 touching, it is possible to easily maintain the style, without the display portion 3 opening, or either the display portion 3 or main part 2 floating towards the other.

A flexible device 1 according to aspect 3 of the disclosure, the magnets 5 forming the pair of magnets according to the second aspect, may be provided at respective positions mutually opposing when the display portion 3 is folded at the folding part 34C. The adsorption parts 6 may be provided at positions that, when the connecting part 4 is folded, oppose the magnets 5, such that the main part 2 and display portion 3 are opposing.

According to the present configuration, when the display portion 3 is folded without interposing the main part 2 therebetween, it is possible to increase the magnetic repulsion force of each of the magnets 5 forming the pair of the magnets, and increase the adsorption force of the main part 2 and display portion 3, in styles with part of the display portion 3 and part of the main part 2 touching each other.

A flexible device 1 according to aspect 4 of the disclosure, the adsorption parts 6 according to the second or third aspects, may be respectively provided on the end portion on the connecting part 4 side in a plan view, and the end portion opposing the end portion of the connecting part 4 side in a plan view, in at least one main surface of the main part 2. The magnets 5 forming the pair of magnets may be respectively provided at positions that oppose the adsorption part 6, when folding the connecting part 4 such that the display portion 3 and main part 2 are opposing.

According to the present configuration, the magnets 5 forming the pair of magnets may be respectively provided on the display portion 3, on a section opposing the end portion of the connecting part 4 side of the main part 2, and a section superimposing the end portion opposing the end portion of the connecting part 4 side, when the connecting part 4 is folded, such that the display portion 3 and main part 2 are opposing.

Thus, according to the present configuration, the display portion 3, when folding the display portion 3 without the main part 2 therebetween, such that part of the flexible display 31 and the other part are opposing, due to the respective pairs of magnets 5 provided on sections superimposing each end, one of the mutually adjacent sections interposing the folding axis 35 of the folding part 34C is in a state of floating from the other section. Thus, according to the present configuration, it is possible to maintain a fixed gap between one of the adjacent sections of the display portion 3 interposing the folding axis 35 of the folding part 34C and the other section, between the respective sections of the display portion 3 with the magnets 5 forming the pair of magnets provided.

A flexible device 1 according to aspect 5 of the disclosure, the display portion 3 according to any one of aspects 1 to 4, a section of the display portion 3 adjacent to the main part 2 via the connecting part 4 configured to freely rotate, between a state of the section touching one main surface of the main part 2, and a state of the section touching the other main surface of the main part 2.

According to the present configuration, it is possible for the display portion 3 to touch the main part 2 with the support body 34 on the inside, or with the flexible display 31 on the inside. Thus, it is possible to realize various styles (usage modes).

A flexible device 1 according to aspect 6 of the disclosure, the display portion 3 according to any one of aspects 1 to 5, in the display portion 3, one of the mutually adjacent sections of the display portion 3 interposing the folding axis 35 of the folding part 34C configured to freely rotate, in the section other than the folding part 34C, between a state of the section opposing the other section via a fixed gap with the flexible display 31 on the inside, and a state of the section opposing the other section via a fixed gap with the flexible display 31 on the outside.

According to the present configuration, it is possible to fold the display portion 3 on top of the main part 2 with the support part 34 on the inside, or with the flexible display 31 on the inside. Furthermore, it is possible to fold the display portion 3 such that it winds around the main part 2 with the support body 34 on the inside, or the flexible display 31 on the inside. In addition, according to the present configuration, when the display portion 3 is folded without interposing the main part 2 therebetween, a fixed gap is formed between one of the mutually adjacent sections interposing the folding axis 35 of the folding part 34C and the other section. Thus, it is possible to realize an even greater variety of styles (usage modes), and reduce the load applied to the folding part 34C compared to when no magnets 5 are provided.

A flexible device 1 according to aspect 7 of the disclosure, the display portion 3 according to any one of aspects 1 to 5, in the display portion 3, one of the mutually adjacent sections of the display portion 3 interposing the folding axis 35 of the folding part 34C configured to freely rotate, between a state of the section superimposing the other section with the flexible display 31 on the inside, and a state of the section superimposing the other section with the flexible display 31 on the outside.

According to the present configuration, it is possible to fold the display portion 3 with the support body 34 on the inside, or with the flexible display 31 on the inside. Thus, it is possible to realize a variety of styles (usage modes), and reduce the load applied to the folding part 34C in any case compared to when no magnets 5 are provided.

The disclosure is not limited to each of the embodiments stated above, and various modifications may be implemented within a range not departing from the scope of the claims. Embodiments obtained by appropriately combining technical approaches stated in each of the different embodiments also fall within the scope of the technology of the disclosure. Moreover, novel technical features may be formed by combining the technical approaches stated in each of the embodiments.

REFERENCE SIGNS LIST

1 Flexible device
2 Main part
2a Information input surface
2b Rear surface
3 Display part
4 Connecting part
5 Magnet
5N N pole
5S S pole
6 Adsorption part
21 Information input portion
22 Housing
23 Mounting board
31 Flexible display
31A First display region
31B Second display region
32 Core
33 Cover member
33a Recessed portioned portion
34 Support body
34A First support part
34B Second support part
34C Folding part
35 Folding axis
41 FPC board
42 Cover layer

The invention claimed is:

1. A flexible device comprising:
   a main part having a plate-shape;
   a display portion; and
   a connecting part being flexible and connecting the main part with the display portion, wherein
   the display portion includes:
      a flexible display,
      a support body including at least one foldable folding part and the flexible display being laid straddling the folding part, and
      at least a pair of magnets being provided on the support body,
   in a plan view, in a state where the display portion is expanded, at least the pair of magnets are respectively disposed on mutually adjacent regions of the support body with a folding axis of the folding part between the mutually adjacent regions, such that only N poles or S poles of at least the pair of magnets are disposed on a side of the support body where the flexible display is provided and only opposing poles of at least the pair of magnets are disposed on a side of the support body opposite to the side where the flexible display is provided,
   at least the pair of magnets are disposed to cause a repelling force to act between the pair of magnets when folding the display portion such that one part and the other part of the flexible display are directly opposing each other, with the flexible display at least partially provided between the pair of magnets.

2. The flexible device according to claim 1, wherein the main part is provided with at least one adsorption part including a magnetic material that is adsorbed to at least one of the pair of magnets, within the magnetic field of the at least one of the pair of magnets, when the connecting part is folded such that the main part and display portion are opposing.

3. The flexible device according to claim 2, wherein:
   the pair of magnets are respectively provided at positions that are opposing when folding the display portion at the folding part, and
   the at least one adsorption part is provided at positions that oppose the pair of magnets when the connecting part is folded such that the main part and the display portion are opposing.

4. The flexible device according to claim 2, wherein:
   the at least one adsorption part includes a plurality of adsorption parts,
   the plurality of adsorption parts are respectively provided on a first end portion on the connecting part side in a plan view, and on a second end portion opposing the first end portion on the connecting part side in a plan view, in at least one main surface of the main part, and
   the pair of magnets are respectively provided at positions that oppose the adsorption part, when folding the connecting part such that the display portion and the main part are opposing.

5. The flexible device according to claim 1, wherein a section of the display portion adjacent to the main part via the connecting part configured to freely rotate, between a state of the section touching one main surface of the main part, and a state of the section touching the other main surface of the main part.

6. The flexible device according to claim 1, wherein, in the display portion, one of the mutually adjacent sections of the display portion interposing the folding axis of the folding part configured to freely rotate, in the section other than the folding part, between a state of the section opposing the other section via a fixed gap with the flexible display being on the inside, and a state of the section opposing the other section via a fixed gap with the flexible display being on the outside.

7. The flexible device according to claim 1, wherein, in the display portion, one of the mutually adjacent sections of the display portion interposing the folding axis of the folding part configured to freely rotate, between a state of the section superimposing the other section with the flexible display on the inside, and a state of the section superimposing the other section with the flexible display on the outside.

8. The flexible device according to claim 1, wherein, in a plan view, in a state where the display portion is expanded, at least the pair of magnets are respectively disposed on the mutually adjacent regions of the support body with the folding axis of the folding part between the mutually adjacent regions, such that only the N poles of at least the pair of magnets are disposed on the side of the support body where the flexible display is provided and only the S poles of at least the pair of magnets are disposed on the side of the support body opposite to the side where the flexible display is provided.

* * * * *